United States Patent
Ito et al.

(10) Patent No.: US 6,687,778 B2
(45) Date of Patent: Feb. 3, 2004

(54) PERIPHERAL DEVICE FOR INFORMATION PROCESSING

(75) Inventors: Takafumi Ito, Ome (JP); Shogo Suzuki, Matsudo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 461 days.

(21) Appl. No.: 09/748,856

(22) Filed: Dec. 28, 2000

(65) Prior Publication Data

US 2001/0042149 A1 Nov. 15, 2001

(30) Foreign Application Priority Data

Jan. 5, 2000 (JP) ........................................ 2000-000485

(51) Int. Cl.[7] .............................................. G06F 13/00
(52) U.S. Cl. ........................................ 710/301; 710/303
(58) Field of Search ................................ 710/301, 303; 235/380, 375; 361/737, 685, 686

(56) References Cited

U.S. PATENT DOCUMENTS

| | | | |
|---|---|---|---|
| 5,357,091 A | * | 10/1994 | Ozawa et al. ............... 235/380 |
| 5,918,163 A | | 6/1999 | Rossi |
| 6,108,199 A | * | 8/2000 | Bonardi et al. ............. 361/686 |
| 6,456,491 B1 | * | 9/2002 | Flannery et al. ............. 361/685 |
| 6,570,767 B1 | * | 5/2003 | Vapaakoski et al. ........ 710/301 |

OTHER PUBLICATIONS

Copy of U.S. application Ser. No. 09/748,855 filed Dec. 28, 2000.
Copy of U.S. application Ser. No. 09/748,857 filed Dec. 28, 2000.

* cited by examiner

*Primary Examiner*—Khanh Dang
(74) *Attorney, Agent, or Firm*—Finnegan, Henderson, Farabow, Garrett & Dunner, L.L.P.

(57) ABSTRACT

A card-type peripheral device has a PCMCIA card shape for the device to be inserted in a slot formed in a PC. The device includes an SD card slot for an SD card to be inserted therein, and a converting adapter section configured to work as a converting adapter for the SD card. The peripheral device also includes a communication section configured to perform communication with the PC, when the device is not inserted in the slot of the PC. The peripheral device further includes a function section configured to selectively perform either one of a peripheral equipment function and an independent equipment function, depending on connection states of the device relative to the PC.

20 Claims, 5 Drawing Sheets

PERIPHERAL DEVICE FOR INFORMATION PROCESSING

CROSS-REFERENCE TO RELATED APPLICATIONS

This application is based upon and claims the benefit of priority from the prior Japanese Patent Application No. 2000-000485, filed Jan. 5, 2000, the entire contents of which are incorporated herein by reference.

BACKGROUND OF THE INVENTION

The present invention relates to a peripheral device for information processing, which has a shape that allows the device to be put in a slot formed in an information processing apparatus, such as a personal computer.

In recent years, various kinds of card-type peripheral devices have been sold on the market, such that they are used in a state where each of them is inserted in a slot formed in an information processing apparatus, such as a personal computer (PC). When being inserted in the card slot, i.e., being placed in the casing of the information processing apparatus, the card-type peripheral device is recognized by the information processing apparatus, and allows the installed functions to be performed. Accordingly, conventional card-type peripheral devices are used on condition that each of them is put in an information processing apparatus, and cannot be used when they are separated from or independent of card slots.

Peripheral devices, such as a mouse, used for information processing apparatuses are physically independent of the information processing apparatuses. However, where a peripheral device is used for a portable information processing apparatus, such as a notebook-type PC, the apparatus and the device have to be carried together. In addition, each conventional peripheral device has a single function, and thus, where several functions, such as a headphone and a remote control, are used for an information processing apparatus, it is necessary to carry several peripheral devices corresponding to the respective functions.

As described above, conventional peripheral devices cannot be used in a state separated from or independent of card slots formed in information processing apparatuses, thereby limiting their usage. Furthermore, where an information processing apparatus is carried and used, a peripheral device used for the apparatus has to be carried with it. Where several peripheral devices are used, they have to be carried together, which is inconvenient.

BRIEF SUMMARY OF THE INVENTION

An object of the present invention is to provide a peripheral device which is easy to carry and its use not limited to only being put in a slot formed in an information processing apparatus.

According to a first aspect of the present invention, there is provided a peripheral device for information processing, which has a shape that allows the device to be put in a first slot formed in an information processing apparatus, comprising:

a data processing section;
a first connecting section configured to interface the data processing section with the information processing apparatus, when the peripheral device is put in the first slot;
a second slot configured for an information device having a second shape to be put therein;
a second connecting section configured to interface the data processing section with the information device, when the information device is put in the second slot;
a communication section configured for the data processing section to communicate with the information processing apparatus, when the peripheral device is not put in the first slot;
a first function section having a peripheral equipment function configured to pre-process or post-process data in cooperation with the data processing section, for the information processing apparatus; and
a second function section having an independent equipment function configured to process data in cooperation with the data processing section, independently of the information processing apparatus.

According to a second aspect of the present invention, there is provided a peripheral device for information processing, which has a shape that allows the device to be put in a first slot formed in an information processing apparatus, comprising:

a second slot configured for an information device having a second shape to be put therein;
a converting adapter section configured to work as a converting adapter for the information device;
a communication section configured to perform communication with the information processing apparatus, when the peripheral device is not put in the first slot; and
a function section configured to selectively perform either one of a peripheral equipment function for the information processing apparatus, and an independent equipment function independently of the information processing apparatus, depending on connection states of the peripheral device relative to the information processing apparatus.

With the arrangement described above, even when a peripheral device is not put in a slot formed in an information processing apparatus, the device can perform a peripheral equipment function for the information processing apparatus, or an independent equipment function independently of the information processing apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described hereinafter with reference to the accompanying drawings. In the following description, the constituent elements having substantially the same function and arrangement are denoted by the same reference numerals, and a repetitive description will be made only when necessary.

Figure 1:
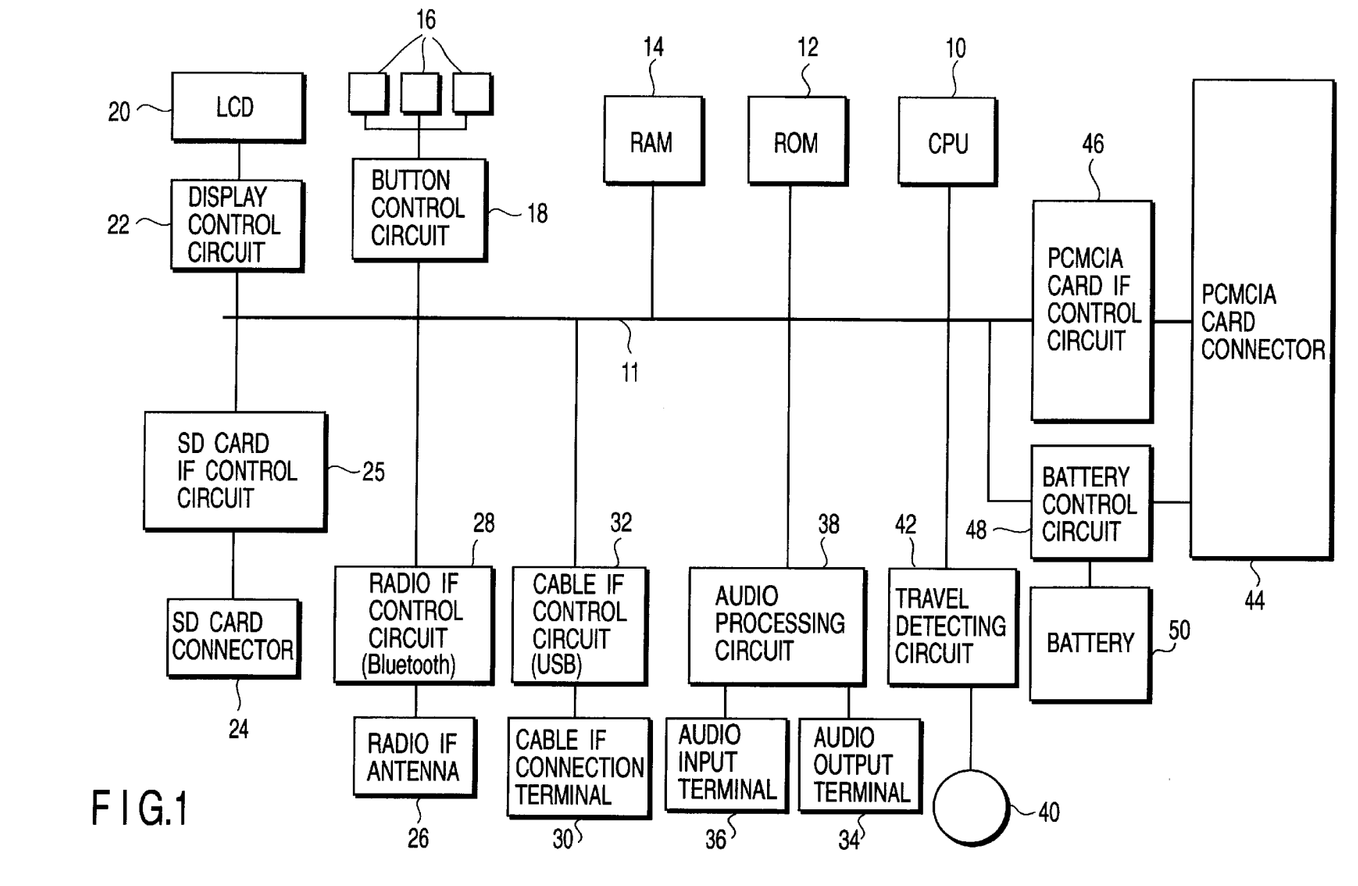
FIG. 1 is a block diagram showing a system configuration of a card-type peripheral device according to an embodiment of the present invention.
Figure 2:
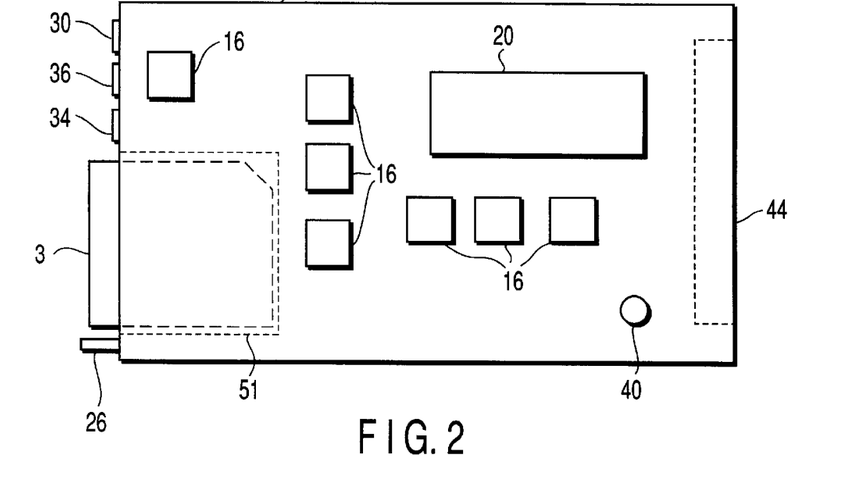
FIG. 2 is a plan view showing the card-type peripheral device.
Figure 3A:
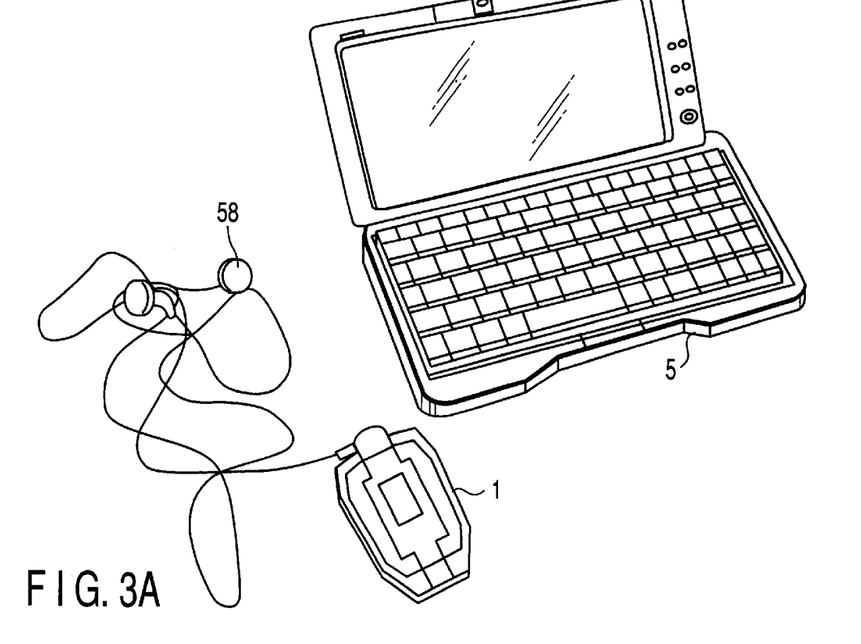
FIGS. 3A and 3B are views showing operation manners of the card-type peripheral device relative to an information processing apparatus.
Figure 3B:
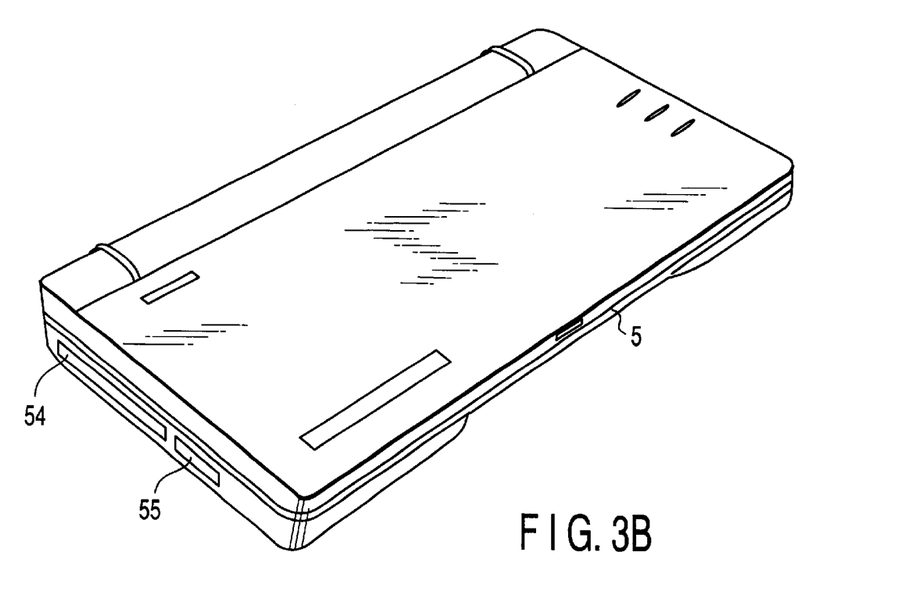

FIG. 1 is a block diagram showing a system configuration of a card-type peripheral device 1 or a peripheral device for information processing according to an embodiment of the present invention. FIG. 2 is a plan view showing the card-type peripheral device 1. FIGS. 3A and 3B are views showing operation manners of the card-type peripheral device 1 relative to a PC (personal computer) 5 or an information processing apparatus.

The peripheral device 1 according to the present invention has a function as a converting adapter for another card-type information device or storage medium, such as an SD (Secure Digital) card 3. The peripheral device 1 has a shape (card shape) to allow the device 1 to be inserted in a slot formed in the PC 5, but the peripheral device 1 can operate in any one of three states, i.e., a first state where it is inserted in the slot, a second state where it is separated from the slot and communicates with the PC 5, and a third state where it is separated from the slot and works as an independent device.

As shown in FIG. 1, the peripheral device 1 according to the present invention includes a CPU 10, internal bus 11, ROM 12, RAM 14, operation buttons 16, button control circuit 18, LCD 20, display control circuit 22, SD card connector 24, SD card interface control circuit 25, radio interface antenna 26, radio interface control circuit 28, cable interface connection terminal 30, cable interface control circuit 32, audio output terminal 34, audio input terminal 36, audio processing circuit 38, travel detector 40, travel detecting circuit 42, PCMCIA (Personal Computer Memory Card International Association) card connector 44, PCMCIA card interface control circuit 46, battery control circuit 48, and battery 50.

The CPU 10 is connected to the respective portions through the internal bus 11 to control the entire peripheral device 1, and carries out programs stored in the ROM 12 to perform various kinds of functions. The CPU 10 can perform predetermined functions respectively, in the first to third states described above. According to this embodiment, in the first state, the peripheral device 1 can operate as an adapter function for another information device, or an audio input/output function. In the second state, the peripheral device 1 can operate as an adapter function for another information device, or an audio input/output function, as in the first state, and can further operate as a pointing device (mouse) or a remote control, i.e., an instructing device. In the third state, the peripheral device 1 can operate as an audio record/reproduce device, i.e., an audio processing device. These functions performed by the peripheral device 1 will be described in detail later.

The ROM 12 is a reading only memory for the CPU 10, which stores programs and/or data. According to this embodiment, the ROM 12 stores programs corresponding to the functions to be performed respectively in the first and third states. The RAM 14 is a read/write memory for the CPU 10, and is used as a working area for temporarily storing various kinds of data.

The operation buttons 16 are used for inputting various kinds of instructions from a user to the peripheral device 1. The movement and/or operation content of the operation buttons 16 are detected by the button control circuit 18 and reported to the CPU 10. In the third state where the peripheral device 1 is used separately from and independently of the PC 5, the operation buttons 16 are used for inputting various kinds of instructions to this independent device, i.e., the audio record/reproduce device.

The LCD 20 is provided to display the operation state of the peripheral device 1, information to a user, and so forth, and is controlled by the display control circuit 22. The display control circuit 22 manages display control for displaying various kinds of information, under the control of the CPU 10, when the peripheral device 1 is used in the second or third state.

The SD card connector 24 is provided to allow an SD (Secure Digital) card 3 to be connected thereto. When the SD card 3 is inserted into an SD card slot 51 formed in the casing of the peripheral device 1, the SD card 3 is connected to the SD card connector 24. The SD card interface control circuit 25 accesses the SD card 3 connected to the SD card connector 24 to write, delete, or read-out data, under the control of the CPU 10.

The radio interface antenna 26 is provided to communicate with the PC 5 when the peripheral device 1 is used in the second state, and to transmit and receive radio signals relative to the PC by means of radio communication. The radio interface control circuit 28 controls radio signals transmitted and received by the radio interface antenna 26. The peripheral device 1 according to this embodiment utilizes "Bluetooth" as the radio communication system.

Bluetooth is a radio communication standard for short distances, for performing radio communication within ten meters, using ISM (Industry Science Medical) band of 2.4 GHz band. Bluetooth uses a frequency hopping method as a spectrum diffusion technique, and allows, at most, eight devices to be connected by a time-division multiplex system. In Bluetooth, a network, which is called a piconet, is formed by the devices connected by the time-division multiplex system, wherein one of the devices works as a host device while the other work as slave devices. In this network, i.e., the piconet, connection authentication is performed with PIN (Personal Identification Number) cords.

The cable interface connection terminal 30 is provided to communicate with the PC 5 when the peripheral device 1 is used in the second state, and to connect the SD card 3 and the PC 5 to each other through a cable, i.e., a USB (Universal Serial Bus) cable. The cable interface control circuit 32 controls communication with the PC 5 connected to the cable interface connection terminal 30 through the USB cable. The peripheral device 1 according to this embodiment utilizes "USB" as the cable communication system.

The audio output terminal 34 is used as a connector to be connected to an audio output device, such as a headphone or a speaker, when the peripheral device 1 operates as an audio input/output function. The audio input terminal 36 is used as a connector to be connected to an audio input device, such as a microphone, when the peripheral device 1 operates as the audio input/output function. The audio processing circuit 38 is used to control input/output of audio signals outputted from the audio output terminal 34 and inputted from the audio input terminal 36, when the peripheral device 1 operates as the audio input/output function. The audio processing circuit 38 includes an output amplifier, a DA converter, and a decoding circuit for handling compressed data, which are for the audio output; and an input amplifier, an AD converter, and a data compressing circuit, which are for the audio input.

The travel detector 40 is used as a ball rotation mechanism for detecting control inputs, when the peripheral device 1 operates as a pointing device, e.g., a mouse in this embodiment. The travel detecting circuit 42 detects control inputs, i.e., travel distances, given to the travel detector 40.

The PCMIA card connector 44 is arranged to be connected to the PC 5 when the peripheral device 1 is inserted in the PC 5. The peripheral device according to this embodiment has a card shape (a first shape) in accordance with PCMIA. The peripheral device 1 is inserted in the PCMCIA-type slot formed in the PC 5, and the PCMIA card connector 44 is connected to a connector of the PC 5, so that the peripheral device 1 can transmit and receive various kinds of signals, as well as being supplied with electrical power. The PCMCIA card interface control circuit 46 controls signals transmitted and received by the PCMIA card connector 44, when the peripheral device 1 is connected to the PC 5 through the PCMCIA card connector 44.

The battery control circuit 48 controls supply of electrical power for driving the peripheral device 1. The battery control circuit 48 is arranged to use electrical power supplied from the PC 5 as power for driving the peripheral device 1, and partly as power for charging the battery 50, when the peripheral device 1 is connected to the PC 5. The battery control circuit 48 is also arranged to use electrical power charged in the battery 50 as power for driving the peripheral device 1, when the peripheral device 1 is separated from the PC 5 and communicates with the PC 5, or the peripheral device 1 works as an independent device. The battery 50 is a secondary battery arranged to charge and discharge electrical power for driving the peripheral device 1.

As shown in FIG. 2, the peripheral device 1 has a shape in accordance with PCMCIA, so that it is inserted in the PCMCIA-type card slot formed in the PC 5. When the peripheral device 1 is inserted in the slot of the PC 5, the PCMCIA card connector 44 is connected to the PC 5 side. On the other hand, the peripheral device 1 has the SD card slot 51 (a second slot), in which an SD card 3, i.e., another information device, can be inserted. When the SD card 3 is inserted in the SD card slot 51, a connector of the SD card 3 is connected to the SD card connector 24. Furthermore, on the outer surface of the peripheral device 1, there are the radio interface antenna 26, the cable interface connection terminal 30, the audio output terminal 34, and the audio input terminal 36, in addition to the travel detector 40, the operation buttons 16, and the LCD 20.

FIG. 3A shows the second or third state where the peripheral device 1 is separated from the PC 5. FIG. 3B shows a state where the peripheral device 1 is inserted in the card slot 54 formed in a side of the casing of the PC 5, so that it is integrated with the PC 5.

An explanation will be given of different operation states of the card-type peripheral device 1.

Figure 4A:
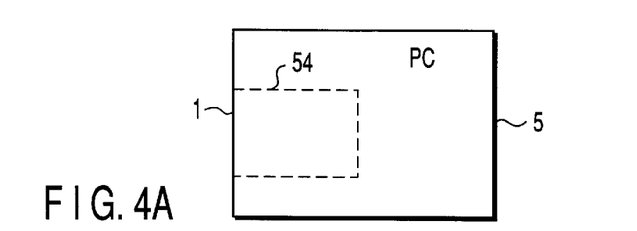
FIGS. 4A, 4B, 4C, and 4D are views showing different operation states of the card-type peripheral device.
Figure 4B:
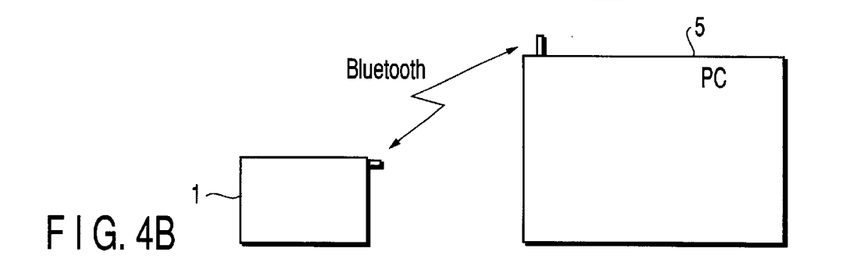
Figure 4C:
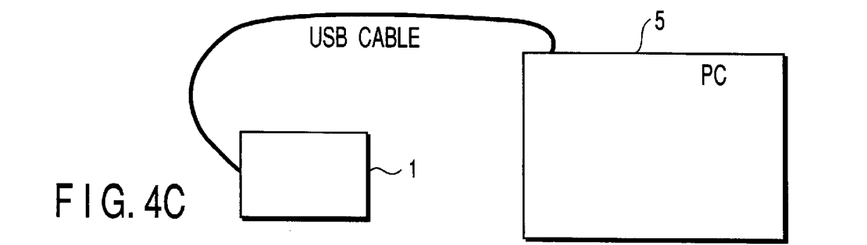
Figure 4D:
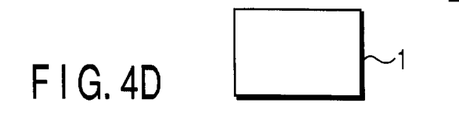

FIGS. 4A to 4D are views showing different operation states of the card-type peripheral device 1. FIG. 4A shows the first state where the peripheral device 1 is inserted in the card slot 54 formed in the PC 5. FIGS. 4B and 4C show the second state where the peripheral device 1 is separate from the PC 5 and communicates with the PC 5. In the second state, it is possible to select either one of a manner using a radio interface (Bluetooth), as shown in FIG. 4B, and a manner using a cable interface (USB), as shown in FIG. 4C. FIG. 4D shows the third state where the peripheral device 1 works as a device independent of the PC 5.

[1] First state of the peripheral device 1 inserted in the PC 5:

In this case, the peripheral device 1 is used while it is inserted in the card slot 54 of the PC 5, as shown in FIG. 4A. The peripheral device 1 sends and receives various kinds of data relative to the PC 5 through the PCMCIA card connector 44. Also, the peripheral device 1 directly receives electrical power from the PC 5 through the PCMCIA card connector 44. The battery control circuit 48 uses electrical power supplied through the PCMCIA card connector 44 as power for driving the peripheral device 1, and partly as power for charging the battery 50 to be ready for a state where the peripheral device 1 is separated from the PC 5.

Figure 5:
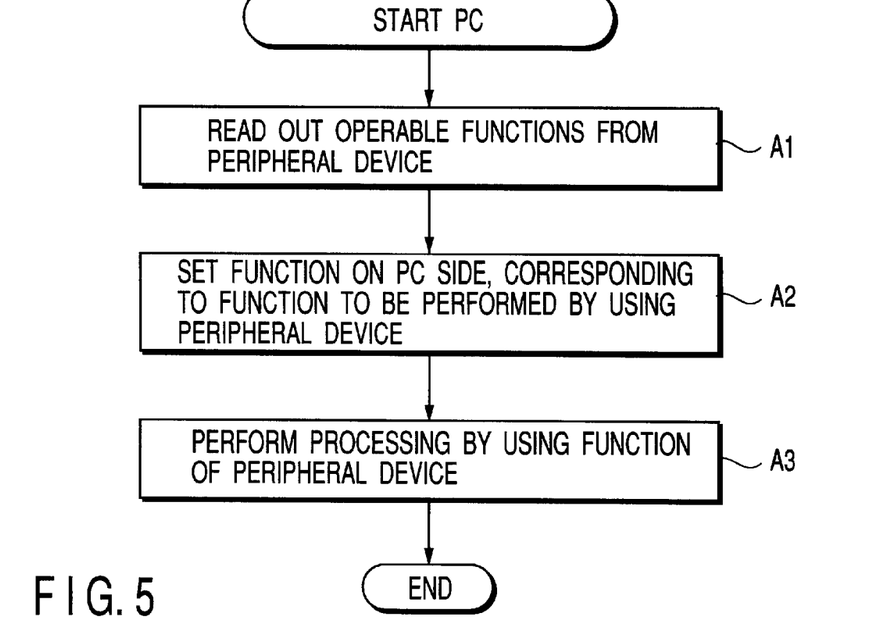
FIG. 5 is a flow chart explaining an operation of a personal computer when the card-type peripheral device is used in the first state.

When the peripheral device 1 is used in the first state, the PC 5 utilizes functions performed by the peripheral device 1, as shown in the flow chart of FIG. 5. First, the PC 5 accesses the peripheral device 1 in the card slot 54, and reads out the contents of operable functions from the peripheral device 1 (Step A1). The programs of various kinds of functions to be performed by the peripheral device 1 are stored in the ROM 12 of the peripheral device 1 in advance, so that the PC 5 can discriminate the operable functions.

Where there are a plurality of operable functions in the peripheral device 1 in the first state, the peripheral device 1 may be arranged such that the correspondence of functions to be performed relative to the operation buttons 16 may be set by a user in advance. In this case, the CPU 10 sets the functions to be performed, in accordance with control inputs given to the operation buttons 16 and inputted through the button control circuit 18, so that the PC 5 can discriminate the functions to be performed.

When a function to be performed is set in the peripheral device 1, the PC 5 sets a function on the PC 5 side, to be performed by using the peripheral device 1 (Step A2). Then, the PC 5 carries out the process using the function of the peripheral device 1 (Step A3).

According to this embodiment, in the first state, the peripheral device 1 can operate as either one of an SD card adapter, i.e., a converting adapter, and an audio input/output card, i.e., an audio input/output device, which are peripheral equipment functions.

<1-1> Operation as the SD card adapter:

In this case, the SD card 3 is inserted in the SD card slot 51 formed in the peripheral device 1. From the PC 5 to the peripheral device 1, accessing information and/or writing information relative to the SD card 3 are sent through the PCMCIA card connector 44 and the PCMCIA card interface control circuit 46. Then, the CPU 10 causes the accessing information and/or the writing information to be once received, and then sent through the SD card interface control circuit 25 and the SD card connector 24 to the SD card 3 inserted in the SD card slot 51.

Similarly, when a request for reading out data stored in the SD card 3 is sent from the PC 5, the CPU 10 causes the corresponding information to be read out from the SD card 3, and sent to the PC 5 through the PCMCIA card interface control circuit 46 and the PCMCIA card connector 44.

<1-2> Operation as the audio input/output card:

When audio output is performed, compressed audio data in an audio compressed file, which is stored in a memory, e.g., the hard disc device, built in the PC 5, is sent to the peripheral device 1 through the PCMCIA card connector 44 and the PCMCIA card interface control circuit 46. Then, the CPU 10 causes the compressed audio data from the PC 5 to be transferred to the audio processing circuit 38, so that the audio output is performed. Specifically, the audio processing circuit 38 decodes the compressed audio data, and converts the decoded data to analog data to be outputted from the audio output terminal 34. Consequently, the audio-processed content performed in the PC 5 becomes audible by the peripheral device 1 where a headphone or the like is connected to the audio output terminal 34.

On the other hand, analog sound can be inputted through a microphone connected to the audio input terminal 36. Then, the audio processing circuit 38 converts the inputted analog sound to digital data, and further converts it to compressed audio data by data compression. The CPU 10 causes the compressed audio data formed by the audio processing circuit 38 to be sent to the PC 5 through the PCMCIA card interface control circuit 46 and the PCMCIA card connector 44. The PC 5 stores the compressed audio data from the peripheral device 1 in a file prepared in a memory, e.g., the hard disc device. By doing so, the sound inputted through the peripheral device 1 can be used for audio processing in the PC 5.

[2] Second state of the peripheral device 1 separated from the PC 5, using the radio I/F:

In this case, the peripheral device 1 is used while it is separated from the PC 5, as shown in FIG. 4B. The peripheral device 1 communicates with the PC 5 through the radio interface, i.e., radio communication of Bluetooth, in this embodiment. Accordingly, in this case, the PC 5 also includes a function for performing the radio communication of Bluetooth. Also in this case, the peripheral device 1 is driven by electric power supplied from the built-in battery 50.

Where there are a plurality of operable functions in the peripheral device 1 in the second state with use of the radio interface, the peripheral device 1 may be arranged such that the correspondence of functions to be performed relative to the operation buttons 16 may be set by a user in advance. In this case, the CPU 10 sets the functions to be performed, in accordance with control inputs given to the operation buttons 16 and inputted through the button control circuit 18.

According to this embodiment, in the second state with use of the radio interface, the peripheral device 1 can operate as any one of an SD card adapter, an audio input/output card, a mouse, i.e., a pointing device, and a remote control, which are peripheral equipment functions.

<2-1> Operation as the SD card adapter:

In this case, the SD card 3 is inserted in the SD card slot 51 formed in the peripheral device 1. From the PC 5 to the peripheral device 1, accessing information and/or writing information relative to the SD card 3 are sent by radio communication through the radio interface antenna 26 and the radio interface control circuit 28. Then, the CPU 10 causes the accessing information and/or the writing information to be once received, and then sent through the SD card interface control circuit 25 and the SD card connector 24 to the SD card 3 inserted in the SD card slot 51.

Similarly, when a request for reading out data stored in the SD card 3 is sent from the PC 5, the CPU 10 causes the corresponding information to be read out from the SD card 3, and sent to the PC 5 by radio communication through the radio interface control circuit 28 and the radio interface antenna 26.

<2-2> Operation as the audio input/output card:

When audio output is performed, compressed audio data in an audio compressed file, which is stored in a memory, e.g., the hard disc device, built in the PC 5, is sent to the peripheral device 1 through the radio interface antenna 26 and the radio interface control circuit 28. Then, the CPU 10 causes the compressed audio data from the PC 5 to be transferred to the audio processing circuit 38, so that the audio output is performed. Specifically, the audio processing circuit 38 decodes the compressed audio data, and converts the decoded data to analog data to be outputted from the audio output terminal 34. Consequently, the audio-processed content performed in the PC 5 becomes audible by the peripheral device 1 where a headphone or the like is connected to the audio output terminal 34.

On the other hand, analog sound can be inputted through a microphone connected to the audio input terminal 36. Then, the audio processing circuit 38 converts the inputted analog sound to digital data, and further converts it to compressed audio data by data compression. The CPU 10 causes the compressed audio data formed by the audio processing circuit 38 to be sent to the PC 5 through the radio interface control circuit 28 and the radio interface antenna 26. The PC 5 stores the compressed audio data from the peripheral device 1 in a file prepared in a memory, e.g., the hard disc device. By doing so, the sound inputted through the peripheral device 1 can be used for audio processing in the PC 5. Since the peripheral device 1 is connected to the PC 5 by radio communication, input/output of sound handled by audio processing in the PC 5 can be performed while a user is carrying the peripheral device 1 so far as radio communication is possible.

<2-3> Operation as the mouse:

When the peripheral device 1 operates as the mouse, the travel detector 40 corresponds to the ball of an ordinary mouse, and specific buttons of the operation buttons 16 are used as mouse buttons. Where the peripheral device is operated on a desk to move the travel detector 40, the travel detecting circuit 42 detects the movement and recognizes it as a control input, i.e., a travel distance, given to the peripheral device 1.

The CPU 10 causes the control input detected by the travel detecting circuit 42, and/or control contents, i.e., push-button information, given to the specific buttons of the operation buttons 16 and detected by the button control circuit 18, to be sent to the PC 5 through the radio interface control circuit 28 and the radio interface antenna 26. The PC 5 uses the information from the peripheral device as information from a pointing device, and utilizes it for various kinds of control, such as a cursor control. By doing so, the peripheral device 1 can be used as the pointing device of a wireless type.

<2-4> Operation as the remote control:

When the peripheral device 1 operates as the remote control, i.e., an instructing device, for the PC 5, specific buttons of the operation buttons 16 are used as control buttons corresponding to functions of the PC 5. The allocation of the control buttons may be set by a user directly to the peripheral device 1 in advance, or from the PC 5 side when the peripheral device 1 is connected to the PC 5.

Examples of the functions of the PC 5 to be controlled by the peripheral device 1 are functions of performing specific applications, and of starting/stopping transfer of data, such as compressed audio data, stored in a memory of the PC 5 to the peripheral device 1.

When a specific operation button 16 of the peripheral device 1 is operated to send an instruction to the PC 5, the operation of the button is detected by the button control circuit 18 and reported to the CPU 10. The CPU 10 determines a function of the PC 5 required by the operation of the button, and sends a command for performing the function to the PC 5 through the radio interface control circuit 28 and the radio interface antenna 26.

When the PC 5 receives the command for performing the specific function, the PC 5 performs processing in accordance with the command. For example, if the command is an instruction for starting transfer of audio data, such as music, compressed audio data is read out from a memory, such as the hard disc device, and sent to the peripheral device 1 through the radio interface. When the peripheral device 1 receives the compressed audio data from the PC 5, the device 1 stores the data in the RAM 14. Then, the peripheral device 1 changes to a function of the audio input/output card to reproduce and output sound (music) from the compressed audio data stored in the RAM 14.

Furthermore, as in the audio data, the peripheral device 1 can request data from the PC 5 in accordance with a control input given to the operation buttons 16, so that the device 1 receives the data from the PC 5 through the radio interface and displays it on the LCD 20 under the control of the display control circuit 22.

When the peripheral device 1 operates as the remote control, it may be used only for transmitting an instruction for defining an operation of the PC 5, in addition to causing various kinds of data to be transferred from the PC 5 side, as described above. For example, the peripheral device 1 may be used to control the PC 5 to be turned on or off, to perform a specific application, and to be connected to an outside network, e.g., the internet. Since the peripheral device 1 is connected to the PC 5 by radio communication, the PC 5 can be controlled from an arbitrary position so far as radio communication is possible.

In the second state with use of the radio interface described above, radio communication with the PC 5 is performed, using the radio communication function, i.e., the radio interface control circuit 28 and the radio interface antenna 26. It is possible, instead, to utilize a radio interface function prepared in the SD card 3 inserted in the SD card slot 51. Where the SD card 3 works not only as a storing media, but also contains a radio interface function, e.g., of Bluetooth, the peripheral device 1 can utilize the radio interface function of the SD card 3 through the SD card connector 24 of the SD card slot 51 in which the SD card 3 is inserted. The CPU 10 accesses the radio interface function of the SD card 3, e.g., a radio interface control circuit, through the SD card interface control circuit 25 and the SD card connector 24, so that radio communication with the PC 5 is performed through the SD card 3.

An antenna for radio communication may be built in the SD card 3, or may be connected from the outside to an antenna connector arranged on the SD card 3. Instead, only the antenna is disposed on the peripheral device 1, to be connected to an antenna connecting terminal arranged on the SD card 3, when the SD card 3 is inserted in the SD card slot 51.

Where a radio interface function prepared in the SD card 3 is utilized, it is unnecessary to provide a radio communication function on the peripheral device 1 side. However, where the SD card 3 is used for radio communication, the peripheral device 1 cannot work as the SD card adapter, if there is only one card slot 51. Accordingly, if the peripheral device 1 is arranged to be capable of connecting a plurality of SD cards 3 at once, one of the SD cards 3 may be used for radio communication, while another SD card 3 is used as the adapter.

[3] Third state of the peripheral device 1 separated from the PC 5, using the cable I/F:

In this case, the peripheral device 1 is used while it is separated from the PC 5, as shown in FIG. 4C. The peripheral device 1 communicates with the PC 5 through the cable interface, i.e., cable communication of USB (Universal Serial BUS), in this embodiment. Accordingly, in this case, the PC 5 also includes a function for performing the cable communication of USB. Also in this case, the peripheral device 1 is driven by electric power supplied through the USB cable.

Where there are a plurality of operable functions in the peripheral device 1 in the second state with use of the cable interface, the peripheral device 1 may be arranged such that the correspondence of functions to be performed relative to the operation buttons 16 may be set by a user in advance. In this case, the CPU 10 sets the functions to be performed, in accordance with control inputs given to the operation buttons 16 and inputted through the button control circuit 18.

According to this embodiment, in the second state with use of the cable interface, the peripheral device 1 can operate as any one of an SD card adapter, an audio input/output card, a mouse, i.e., a pointing device, and a remote control, which are peripheral equipment functions.

<3-1> Operation as the SD card adapter:

In this case, the SD card 3 is inserted in the SD card slot 51 formed in the peripheral device 1. From the PC 5 to the peripheral device 1, accessing information and/or writing information relative to the SD card 3 are sent by cable communication through the cable interface connection terminal 30 and the cable interface control circuit 32. Then, the CPU 10 causes the accessing information and/or the writing information to be once received, and then sent through the SD card interface control circuit 25 and the SD card connector 24 to the SD card 3 inserted in the SD card slot 51.

Similarly, when a request for reading out data stored in the SD card 3 is sent from the PC 5, the CPU 10 causes the corresponding information to be read out from the SD card 3, and sent to the PC 5 by the cable interface control circuit 32 and the cable interface connection terminal 30.

<3-2> Operation as the audio input/output card:

When audio output is performed, compressed audio data in an audio compressed file, which is stored in a memory, e.g., the hard disc device, built in the PC 5, is sent to the peripheral device 1 through the cable interface connection terminal 30 and the cable interface control circuit 32. Then, the CPU 10 causes the compressed audio data from the PC 5 to be transferred to the audio processing circuit 38, so that the audio output is performed. Specifically, the audio processing circuit 38 decodes the compressed audio data, and converts the decoded data to analog data to be outputted from the audio output terminal 34. Consequently, the audio-processed content performed in the PC 5 becomes audible by the peripheral device 1 where a headphone or the like is connected to the audio output terminal 34.

On the other hand, analog sound can be inputted through a microphone connected to the audio input terminal 36. Then, the audio processing circuit 38 converts the inputted analog sound to digital data, and further converts it to compressed audio data by data compression. The CPU 10 causes the compressed audio data formed by the audio processing circuit 38 to be sent to the PC 5 through the cable interface control circuit 32 and the cable interface connection terminal 30. The PC 5 stores the compressed audio data from the peripheral device 1 in a file prepared in a memory, e.g., the hard disc device. By doing so, the sound inputted through the peripheral device 1 can be used for audio processing in the PC 5.

<3-3> Operation as the mouse:

When the peripheral device 1 operates as the mouse, the travel detector 40 corresponds to the ball of an ordinary mouse, and specific buttons of the operation buttons 16 are used as mouse buttons. Where the peripheral device is operated on a desk to move the travel detector 40, the travel detecting circuit 42 detects the movement and recognizes it as a control input, i.e., a travel distance, given to the peripheral device 1.

The CPU 10 causes the control input detected by the travel detecting circuit 42, and/or control contents, i.e., push-button information, given to the specific buttons of the operation buttons 16 and detected by the button control circuit 18, to be sent to the PC 5 through the cable interface control circuit 32 and the cable interface connection terminal 30. The PC 5 uses the information from the peripheral device as information from a pointing device, and utilizes it for various kinds of control, such as a cursor control. By doing so, the peripheral device 1 can be used as the pointing device of a wireless type.

<3-4> Operation as the remote control:

When the peripheral device 1 operates as the remote control, i.e., an instructing device, for the PC 5, specific buttons of the operation buttons 16 are used as control buttons corresponding to functions of the PC 5. The allocation of the control buttons may be set by a user directly to the peripheral device 1 in advance, or from the PC 5 side when the peripheral device 1 is connected to the PC 5.

Examples of the functions of the PC 5 to be controlled by the peripheral device 1 are functions of performing specific applications, and of starting/stopping transfer of data, such as compressed audio data, stored in a memory of the PC 5 to the peripheral device 1.

When a specific operation button 16 of the peripheral device 1 is operated to send an instruction to the PC 5, the operation of the button is detected by the button control circuit 18 and reported to the CPU 10. The CPU 10 determines a function of the PC 5 required by the operation of the button, and sends a command for performing the function to the PC 5 through the cable interface control circuit 32 and the cable interface connection terminal 30.

When the PC 5 receives the command for performing the specific function, the PC 5 performs processing in accordance with the command. For example, if the command is an instruction for starting transfer of audio data, such as music, compressed audio data is read out from a memory, such as the hard disc device, and sent to the peripheral device 1 through the cable interface. When the peripheral device 1 receives the compressed audio data from the PC 5, the device 1 stores the data in the RAM 14. Then, the peripheral device 1 changes to a function of the audio input/output card to reproduce and output sound (music) from the compressed audio data stored in the RAM 14.

Furthermore, as in the audio data, the peripheral device 1 can request data from the PC 5 in accordance with a control input given to the operation buttons 16, so that the device 1 receives the data from the PC 5 through the cable interface and displays it on the LCD 20 under the control of the display control circuit 22.

When the peripheral device 1 operates as the remote control, it may be used only for transmitting an instruction for defining an operation of the PC 5, in addition to causing various kinds of data to be transferred from the PC 5 side, as described above. For example, the peripheral device 1 may be used to control the PC 5 to be turned on or off, to perform a specific application, and to be connected to an outside network, e.g., the internet. Since the peripheral device 1 is connected to the PC 5 by the USB cable, the PC 5 can be controlled from an arbitrary position so far as the USB cable extends.

[4] Third state of the peripheral device 1 independent of the PC 5:

In this case, the peripheral device 1 is used as a device independent of the PC 5, as shown in FIG. 4D. Also in this case, the peripheral device 1 is driven by electric power supplied from the built-in battery 50.

Figure 6:
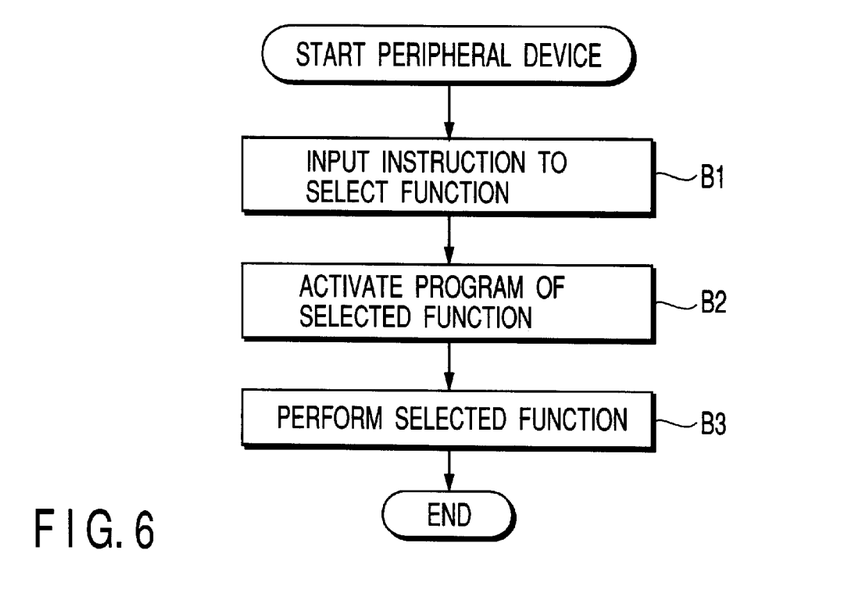
FIG. 6 is a flow chart explaining an operation of the card-type peripheral device when the card-type peripheral device is used in the third state.

When the peripheral device 1 is used in the third state, the peripheral device 1 operates, as shown in the flow chart of FIG. 6. Where there are a plurality of operable functions in the peripheral device 1 in the third state, an instruction is inputted by a user though the operation buttons 16 to select a function to be performed by the peripheral device 1 (Step B1). The CPU 10 activates the corresponding program stored in the ROM 12, in accordance with the control input given to the operation buttons 16 and inputted through the button control circuit 18 (Step B2). Then, the CPU 10 causes the selected function to be performed (Step B3). In the third state, the peripheral device works as an independent device, without relying on the PC 5.

According to this embodiment, in the third state, the peripheral device 1 can operate as an audio record/reproduce device, which is an independent equipment function.

<4-1> Operation as the audio record/reproduce device:

When audio recording is performed, analog sound is inputted through a microphone connected to the audio input terminal 36. Then, the audio processing circuit 38 converts the inputted analog sound to digital data, and further converts it to compressed audio data by data compression. The CPU 10 causes the compressed audio data formed by the audio processing circuit 38 to be sent through the SD card interface control circuit 25 and the SD card connector 24, and stored in the SD card 3 inserted in the SD card slot 51.

When audio reproducing is performed, the CPU 10 causes compressed audio data stored in the SD card 3 inserted in the SD card slot 51 to be read out and transferred to the audio processing circuit 38. The audio processing circuit 38 decodes the compressed audio data, and converts the decoded data to analog data to be outputted from the audio output terminal 34. Consequently, the audio data content stored in the SD card 3 becomes audible by the peripheral device 1 where a headphone or the like is connected to the audio output terminal 34. The audio data may be formed of data recorded in the SD card 3 by the audio recording function described above, or of audio data, such as music, recorded by a different method. For example, the peripheral device 1 may be used such that the device 1 is connected to the PC 5 and used in this state (first or second state), only when audio data is to be recorded in the SD card 3, and then, after recording on the SD card 3 is finished, the device 1 operates as the audio record/reproduce device.

Since the peripheral device 1 operates as an independent device, it can be used in a state connected to the PC 5 when necessary, and also can be taken out and used alone arbitrarily.

As described above, the peripheral device 1 according to the present invention can be used in any one of the first to third states. Furthermore, the peripheral device 1 can perform a plurality of functions, and therefore a user does not have to prepare a plurality of peripheral devices. Even where the PC 5 is a portable-type information processing apparatus to be carried and used in an arbitrary place, the peripheral device 1 can be carried while being inserted in the card slot 54 of the PC 5, i.e., it does not have to be carried separately. The peripheral device 1 has a card shape that allows the device 1 to be inserted in the card slot 54 of the PC 5, and the device 1, on the other hand, allows the SD card 3 to be inserted in the SD card slot 51 formed therein. Accordingly, the peripheral device 1 can utilize the SD card 3 not only as an ordinary data storage media, but also as a function-extension card.

In the above described embodiment, the peripheral device 1 is exemplified by a device having various kinds of functions. However, the peripheral device 1 may be arranged as a device having only one of the respective functions, e.g., SD card adapter, pointing device, remote control (instructing device), and audio input/output function. Furthermore, the peripheral device 1 is exemplified by a device to be used as peripheral equipment for the PC 5. However, the peripheral device 1 may be used as peripheral equipment for an information processing apparatus other than the PC 5. In the first and second state, the peripheral device 1 may be used as an audio input function or an audio output function, instead of the audio input/output function (card) explained in the embodiment. Similarly, in the third state, the peripheral device 1 may be used as an audio recording device or an audio reproducing device, instead of the audio record/reproduce device explained in the embodiment.

Figure 7:
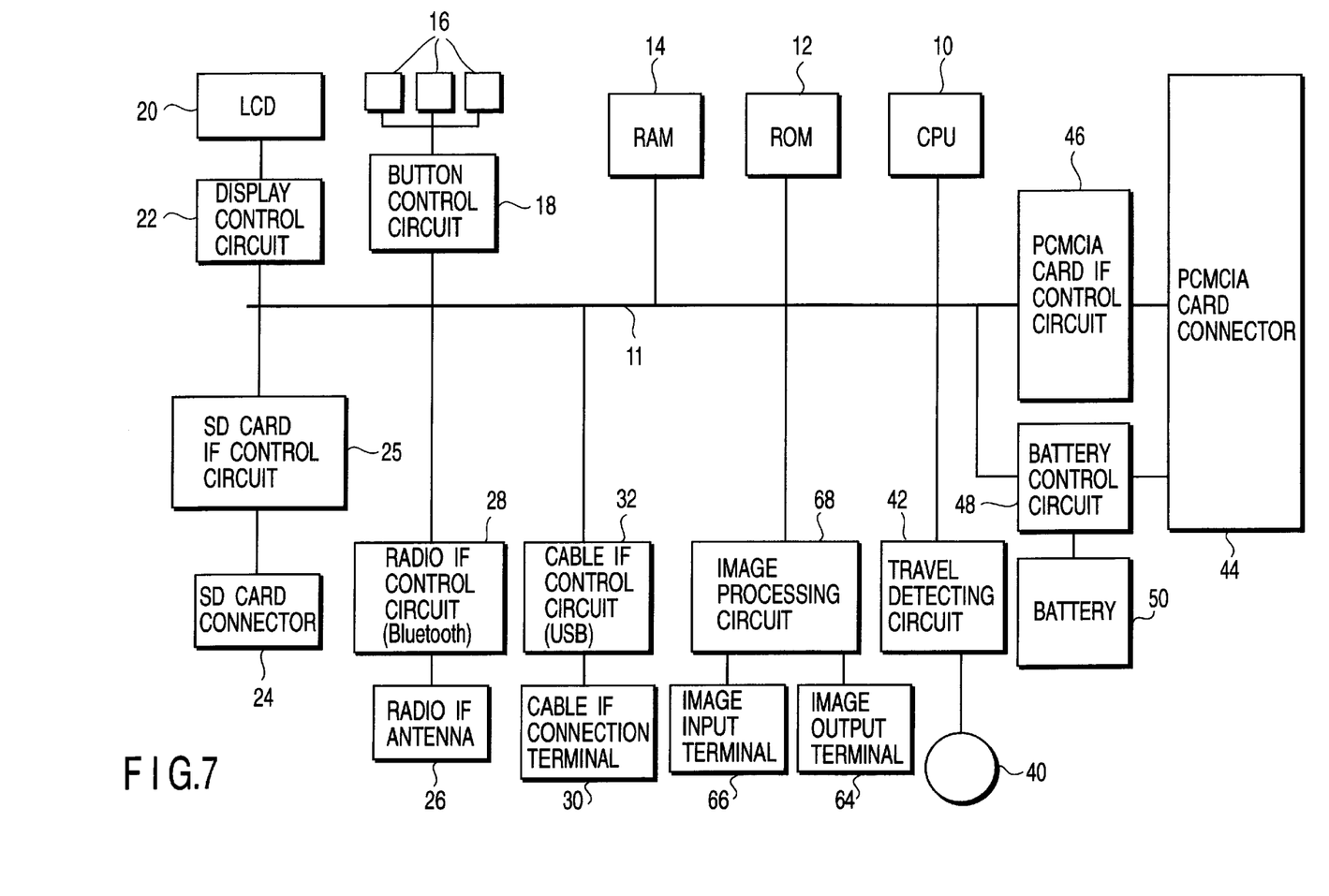
FIG. 7 is a block diagram showing a system configuration of a card-type peripheral device according to a modified embodiment of the present invention.

As functions to be performed by the peripheral device 1 in the first, second, and third state, other functions, such as an image input/output function, may be included, in addition to those described in the embodiment. In this case, image data can be handled as in the audio data according to the embodiment, where the audio output terminal 34, the audio input terminal 36, and the audio processing circuit 38 of FIG. 1 are replaced with an image output terminal 64, an image input terminal 66, and an image processing circuit 68, respectively, as shown in FIG. 7. Specifically, the peripheral device 1 is provided with a terminal to be connected to an optical camera portion, and with an image control circuit for controlling image data inputted through the terminal. Image data inputted through the image control circuit or stored in the SD card 3 is displayed on the LCD 20 by the display control circuit 22, or transmitted to the PC 5 and displayed on the monitor of the PC 5. The peripheral device 1 may receive image data from the PC 5 and displays it on the LCD 20. Accordingly, in this case, the peripheral device 1 can be used as an image input/output device in the first and second states, and as an image record/reproduce device in the third state.

In each embodiment described above, an SD card has been described as an information device to be put in the peripheral device 1. However, memory cards having other shapes and functions can also be used. The techniques described in the above embodiments can be written as programs that can be executed by computers in recording media, e.g., magnetic disks (floppy disks, hard disks, and the like), optical disks (CD-ROMs, DVDS, and the like), and semiconductor memories and provided for various apparatuses. These programs can also be transmitted to various apparatuses via communication media. A computer that implements this apparatus loads programs stored in a recording medium or receives programs via a communication medium, and is controlled by the programs, thereby executing the above processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A peripheral device for information processing, which has a first shape that allows the device to be put in a first slot formed in an information processing apparatus, comprising:

a data processing section;

a first connecting section that interfaces the data processing section with the information processing apparatus, when the peripheral device is put in the first slot;

a second slot that receives an information device having a second shape;

a second connecting section that interfaces the data processing section with the information device, when the information device is put in the second slot;

a communication section that allows the data processing section to communicate with the information processing apparatus, when the peripheral device is not put in the first slot;

a first function section having a peripheral equipment function that pre-processes or post-processes data in cooperation with the data processing section, for the information processing apparatus; and a second function section having an independent equipment function that processes data in cooperation with the data processing section, independently of the information processing apparatus.

2. The device according to claim 1, wherein the first function section comprises a detecting section that detects a control input given to the peripheral device, such that the peripheral device works as a pointing device for inputting the control input into the information processing apparatus through the communication section, when the peripheral device is not put in the first slot.

3. The device according to claim 1, wherein the first function section comprises an instruction input section that inputs an instruction for the information processing apparatus such that the peripheral device works as an instructing device for inputting the instruction into the information processing apparatus through the communication section, when the peripheral device is not put in the first slot.

4. The device according to claim 1, wherein the first function section comprises an audio input/output section that inputs/outputs audio data to be handled in the information processing apparatus, such that the peripheral device works as an audio processing device for inputting/outputting the audio data relative to the information processing apparatus through the communication section, when the peripheral device is not put in the first slot.

5. The device according to claim 1, wherein the first function section comprises an image input/output section that inputs/outputs image data to be handled in the information processing apparatus, such that the peripheral device works as an image processing device for inputting/outputting the image data relative to the information processing apparatus through the communication section, when the peripheral device is not put in the first slot.

6. The device according to claim 1, wherein the second function section comprises an audio processing section that processes audio data, such that the peripheral device works as an audio processing device independently of the information processing apparatus, when the peripheral device is not put in the first slot.

7. The device according to claim 1, wherein the second function section comprises an image processing section that processes image data, such that the peripheral device works as an image processing device independently of the information processing apparatus, when the peripheral device is not put in the first slot.

8. The device according to claim 1, further comprising a battery and a battery control section for controlling operation of the battery, wherein the battery control section uses electric power supplied from the information processing apparatus to charge the battery when the peripheral device is put in the first slot, and uses electric power charged in the battery to drive the peripheral device when the peripheral device is not put in the first slot.

9. The device according to claim 1, wherein the first shape is a shape of a PCMCIA (Personal Computer Memory Card International Association) card, and the second shape is a shape of an SD (Secure Digital) card.

10. The device according to claim 1, wherein the communication section allows the data processing section to communicate with the information processing apparatus by radio communication.

11. The device according to claim 1, wherein the communication section uses a radio communication function of the information device, when the information device is put in the second slot.

12. The device according to claim 1, wherein the communication section allows the data processing section to communicate with the information processing apparatus by cable communication.

13. The device according to claim 1, wherein the peripheral device works as a converting adapter for the information device, when the information device is put in the second slot.

14. The device according to claim 1, wherein the first function section comprises an audio input/output section that inputs/outputs audio data to be handled in the information processing apparatus, such that the peripheral device works as an audio processing device for inputting/outputting the audio data relative to the information processing apparatus through the first connecting section, when the peripheral device is put in the first slot.

15. A peripheral device for information processing, which has a first shape that allows the device to be put in a first slot formed in an information processing apparatus, comprising:
  a second slot that receives an information device having a second shape;
  a converting adapter section that works as a converting adapter for the information device;
  a communication section that communicates with the information processing apparatus, when the peripheral device is not put in the first slot; and
  a function section that selectively performs either one of a peripheral equipment function for the information processing apparatus, and an independent equipment function independently of the information processing apparatus, depending on connection states of the peripheral device relative to the information processing apparatus.

16. The device according to claim 15, wherein the function section performs the peripheral equipment function in a state where the peripheral device is not put in the first slot, but the communication with the information processing apparatus is performed through the communication section.

17. The device according to claim 16, wherein the communication section communicates with the information processing apparatus by radio communication.

18. The device according to claim 17, wherein the communication section uses a radio communication function of the information device, when the information device is put in the second slot.

19. The device according to claim 15, wherein the function section performs the independent equipment function in a state where the peripheral device is not put in the first slot, and the communication with the information processing apparatus is not performed through the communication section.

20. The device according to claim 15, wherein the first shape is a shape of a PCMCIA (Personal Computer Memory Card International Association) card, and the second shape is a shape of an SD (Secure Digital) card.

* * * * *